(12) United States Patent
Yamazaki et al.

(10) Patent No.: US 7,728,081 B2
(45) Date of Patent: Jun. 1, 2010

(54) APPARATUS FOR CONTINUOUS POLYMERIZATION AND METHOD FOR CONTINUOUS POLYMERIZING USING THE SAME

(75) Inventors: Kazuhiro Yamazaki, Niihama (JP); Akira Nishitani, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1077 days.

(21) Appl. No.: 11/240,368

(22) Filed: Oct. 3, 2005

(65) Prior Publication Data
US 2006/0089474 A1 Apr. 27, 2006

(30) Foreign Application Priority Data
Oct. 4, 2004 (JP) ............................. 2004-291151

(51) Int. Cl.
*C08F 2/02* (2006.01)
*B01J 19/00* (2006.01)
*C08F 20/12* (2006.01)

(52) U.S. Cl. ................... 526/61; 526/73; 526/329.7; 526/920; 422/105; 422/131

(58) Field of Classification Search ............ 526/61, 526/73, 329.7, 920; 422/106, 131
See application file for complete search history.

(56) References Cited
U.S. PATENT DOCUMENTS
3,257,375 A * 6/1966 Norwood ............... 526/61

| | | |
|---|---|---|
| 4,027,085 A | 5/1977 | Clemmer et al. |
| 4,742,472 A | 5/1988 | Sugimori et al. |
| 4,888,704 A | 12/1989 | Topliss et al. |
| 2002/0001547 A1 | 1/2002 | Connelly et al. |

FOREIGN PATENT DOCUMENTS

| | | |
|---|---|---|
| EP | 0 165 416 A2 | 12/1985 |
| EP | 0 561 078 A2 | 9/1993 |
| EP | 0 754 707 A2 | 7/1995 |
| GB | 1 067 422 A | 5/1967 |
| GB | 1 547 048 A | 6/1979 |
| JP | 2005-029613 A | 2/2005 |
| WO | WO 2004/113392 A1 | 12/2004 |

OTHER PUBLICATIONS

Richard S.H. Wu, "Dynamic Thermal Analyzer for Monitoring Batch Processes", Chemical Engineering Progress, American Institute of Chemical Engineers, vol. 81, Sep. 1985, (XP001012981), pp. 57-61.

(Continued)

*Primary Examiner*—Fred M Teskin
(74) *Attorney, Agent, or Firm*—Sughrue Mion, PLLC (57) ABSTRACT

An apparatus for continuous polymerization with a simple constitution to produce a polymer having a high quality, as well as a method for producing the polymer using the apparatus, are provided. The apparatus comprises a vessel; a means for supplying a monomer to the vessel; a means for supplying a polymerization initiator to the vessel; a means for detecting a temperature in the vessel; a means for regulating a temperature of an outer wall surface of the vessel so as to have a preset temperature; and a means for controlling a supply flow rate of the monomer and/or the polymerization initiator to the vessel by the monomer supply means and/or the initiator supply means so that the temperature in the vessel becomes substantially the same temperature as the preset temperature.

6 Claims, 2 Drawing Sheets

OTHER PUBLICATIONS

Derwent DWPI Online abstract Accession No. 2005-338002/35 corresponds to JP 2005-113086 A, published Apr. 28, 2005 to Nitto Denko Corporation.

Derwent DWPI Online abstract Accession No. 2006-043338/05 corresponds to JP 2006-002032 A, published Jan. 5, 2006 to Nitto Denko Corporation.

* cited by examiner

APPARATUS FOR CONTINUOUS POLYMERIZATION AND METHOD FOR CONTINUOUS POLYMERIZING USING THE SAME

BACKGROUND OF THE INVENTION

1. Field of the Invention

The present invention relates to an apparatus for continuous polymerization to be used for manufacturing a methacrylate-based polymer and the like, and a method for continuous polymerization using the same.

2. Description of the Related Art

In recent years, a continuously bulk-polymerizing method and a continuously solution-polymerizing method for continuously adding monomers and a polymerization initiator into a polymerization reaction vessel to polymerize the monomers have been adopted for manufacturing a methacrylate-based polymer, an acrylate-based polymer, polystyrene, acrylonitrile-butadiene-styrene resin (ABS) and the like. Among these, the continuously bulk-polymerizing method has the advantage of obtaining a polymer with fewer impurities due to the polymerization reaction in a homogenous phase without using a solvent, a dispersing agent and the like. However, the viscosity of its reaction mixture is extremely high, so that the heat removal of the reaction system and the control of polymerization temperature are difficult. The continuously solution-polymerizing method also has the advantage of obtaining a polymer with fewer impurities, while the heat removal and control of polymerization temperature are relatively easy. However, its productivity tends to be reduced due to a solvent to be used therein.

In addition, Japanese Patent Publication No. 3395291 discloses a method of manufacturing a methacrylate-based polymer by a continuous bulk-polymerizing method in which a polymerization reaction is conducted using a complete mixing-type reaction vessel in an adiabatic state of no substantial comings and goings of heat from outside as well as in a flooded state of no substantial gas phase portion in the reaction vessel during the reaction.

A lot of methods for heat removal of a reaction system have conventionally been known, such as a cooling system by heat transfer in which a reaction system is cooled down using a jacket provided at an outer wall surface of a reaction vessel and a coil disposed in the reaction vessel; and a so-called reflux cooling system in which a raw material monomer and the like are vaporized in a reaction vessel and is taken out of the reaction system to be condensed by cooling and returned again to the reaction system. In the conventional heat removals, cooling may be localized or be conducted abruptly.

In manufacturing a methacrylate-based polymer, such local and/or abrupt cooling of a reaction system tends to cause gel to attach and grow at an inner wall surface of the reaction vessel, which may leads a gelated product contaminated into a polymer produced.

Conventionally, in manufacturing a methacrylate-based polymer, a raw material monomer and a polymerization initiator may be previously mixed and dissolved so that the polymerization initiator has a predetermined concentration, and then be supplied to a reaction vessel. In adopting the manner of a method described in Japanese Patent Publication No. 3395291, the performance of a polymerization reaction in an adiabatic state as well as in a flooded state may prevent from generating gel to attach to an inner wall surface of a reaction vessel due to the localized or abrupt cooling. Still, this method described in Japanese Patent Publication No. 3395291 has a possibility of causing dispersion in quality of the resulting polymer. This is because in order to maintain an adiabatic system in this method, the temperature of a jacket is controlled to be the same temperature as that in the reaction vessel depending on the fluctuation of the temperature in the reaction vessel, and the raw material monomer is previously prepared so as to contain a polymerization initiator at a predetermined concentration, and thus when polymerization temperature fluctuates with a factor of, such as, the change in outside air temperature, a later polymerization temperature and the temperature of the jacket can fluctuate freely.

SUMMARY OF THE INVENTION

Then, one of objects of the present invention is to provide an apparatus for continuous polymerization with a simple constitution to produce a polymer having a high quality, as well as a method for producing the polymer using the apparatus and a method for controlling the continuous polymerization by using the apparatus.

The present invention provides:

an apparatus for continuous polymerization, which comprises:

a reaction vessel;

a means for supplying a raw material monomer to the reaction vessel;

a means for supplying a polymerization initiator to the reaction vessel;

a means for detecting a temperature in the reaction vessel;

a means for regulating a temperature of an outer wall surface of the reaction vessel so as to have a preset temperature; and a means for controlling a supply flow rate of the raw material monomer and/or the polymerization initiator to the reaction vessel by the monomer supply means and/or the initiator supply means so that the temperature in the reaction vessel becomes substantially the same temperature as the preset temperature of the temperature regulation means.

The present invention also provides:

a method for continuous polymerization using an apparatus for continuous polymerization which comprises:

a reaction vessel;

a means for supplying a raw material monomer to the reaction vessel;

a means for supplying a polymerization initiator to the reaction vessel;

a means for detecting a temperature in the reaction vessel;

a means for regulating a temperature of an outer wall surface of the reaction vessel so as to have a preset temperature; and a means for controlling a supply flow rate of the raw material monomer and/or the polymerization initiator to the reaction vessel by the monomer supply means and/or the initiator supply means so that the temperature in the reaction vessel becomes substantially the same temperature as the preset temperature of the temperature regulation means, the method comprising the steps of:

continuously supplying a raw material monomer and a polymerization initiator to the reaction vessel;

controlling a supply flow rate of the raw material monomer and/or the polymerization initiator to the reaction vessel so that the temperature in the reaction vessel becomes substantially the same temperature as the preset temperature of the temperature regulation means.

In addition, the present invention further provides:

a method for producing a polymer obtained by polymerizing a methacrylate-based monomer as the raw material monomer by the above-described method in which:

the preset temperature of the temperature regulation means is in the range of 120 to 180° C.; and a ratio A:B of a supply flow rate A (kg/h) of the methacrylate-based monomer to a supply flow rate B (kg/h) of a mixture of the methacrylate-based monomer and the polymerization initiator is in the range between 80:20 and 98:2.

In accordance with the apparatus and the method in the present invention, even though the temperature in a reaction vessel is raised by, for example, the change of outside air temperature and/or the temperature of a raw material monomer supplied to the reaction vessel, the reduction of the supply flow rate of the polymerization initiator to the reaction vessel allows heat generation due to polymerization to be reduced; therefore, the control of polymerization temperature can be achieved without performing a cooling process. Also, a complicated cooling apparatus for directly cooling a reaction system is not always employed, which is an external circulation-type cooling means utilizing heat of evaporation as the control by a conventional method, and a process of directly cooling a reaction system is not always employed, so that the loss of heat energy can be restrained.

In the present invention, on the basis of a result of comparing a preset temperature of the above-mentioned temperature regulation means with the temperature in a reaction vessel, the supply flow rate of a polymerization initiator to a reaction vessel is controlled to maintain a preferable temperature in a reaction vessel. As a result, an adiabatic state in a reaction vessel can be practically maintained, and gel can be prevented from growing from an inner wall of the reaction vessel. In addition, it is not necessary that heating/cooling temperature of the above-mentioned temperature regulation means is raised or lowered in accordance with the temperature of the reaction system, so that the efficiency of heat energy is favorable, and the consumption of energy can be restrained.

In a conventional cooling of the reaction system, for example, by using a jacket, an enlargement of the scale of a reaction vessel may render heat exchange difficult. On the other hand, in the present invention, even when the scale of a reaction vessel is large, it is possible to promptly response to the temperature change in a reaction vessel. Further, in the present invention, the temperature change in the reaction vessel itself can be restrained and properly controlled, so that a polymer of high quality can be manufactured.

DETAILED DESCRIPTION OF PREFERRED EMBODIMENTS

An apparatus for continuous polymerization in the present invention may be a continuously bulk-polymerizing apparatus, a continuously solution-polymerizing apparatus or the like.

Examples of a raw material monomer to be used in the present invention include a methacrylate-based monomer, an acrylate-based monomer, styrene and acrylonitrile. These monomers may be used singly or in a mixture of two or more kinds of them. Rubber polymers such as butadiene and SBR can be dissolved for use.

Figure 1:
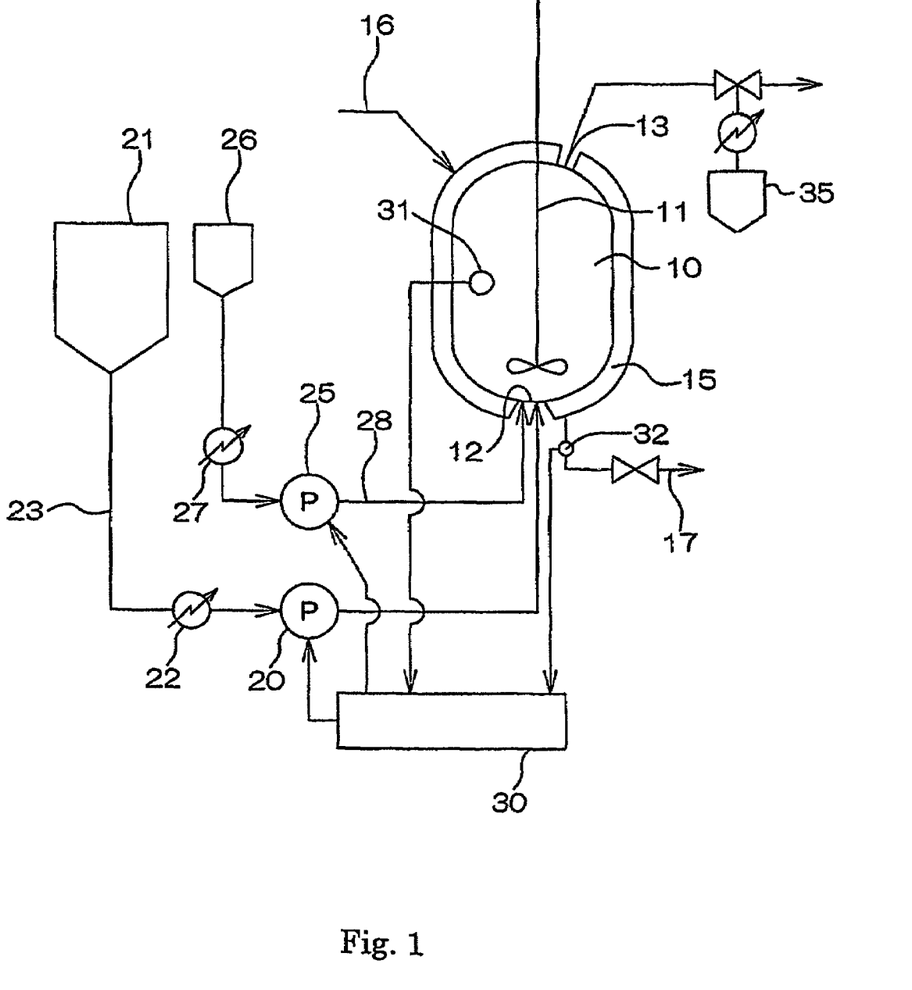
FIG. 1 is a block diagram showing a constitution of an example apparatus for continuous polymerization of the present invention.

One of embodiments of the present invention is detailed, referring to a continuously bulk-polymerizing apparatus shown in FIG. 1.

The apparatus shown in FIG. 1 comprises:

a reaction vessel 10 (which is preferably a complete mixing-type reaction vessel);

a monomer supply means 20 (a monomer supply pump 20) for supplying a raw material monomer to reaction vessel 10;

an initiator supply means 25 (an initiator supply pump 25) for supplying a polymerization initiator to reaction vessel 10;

a temperature detection means 31 (a temperature sensor 31) for detecting a temperature in reaction vessel 10;

a temperature regulation means 15 (a jacket 15) for regulating a temperature of an outer wall surface of reaction vessel 10 so as to have a preset temperature; and a supply flow rate control means 30 (a control unit 30) for controlling a supply flow rate of the raw material monomer and/or the polymerization initiator to reaction vessel 10 by the monomer supply means (monomer supply pump 20) and/or the initiator supply means (initiator supply pump 25) so that the temperature in the reaction vessel 10 detected by the temperature detection means (temperature sensor 31) becomes substantially the same temperature as a preset temperature of the temperature regulation means (jacket 15).

In an apparatus shown in FIG. 1, the reaction vessel 10 is preferably a complete mixing-type reaction vessel in which the content inside the reaction vessel can be made into a substantially complete mixing state. The reaction vessel 10 may have an agitating blade 11, which is not particularly limited. Examples of the agitating blade include a MIG blade, a Maxblend blade (which is a registered trademark, manufactured by Sumitomo Heavy Industries, Ltd.), a paddle blade, a double helical ribbon blade and a FULLZONE blade (manufactured by Shinko Pantec Co., Ltd.). In order to improve the effect of agitation in the reaction vessel, it is desirable to mount a baffle in the reaction vessel.

The reaction vessel 10 more preferably has a higher agitation efficiency. However, it is not preferred to have an agitation power larger than required, since an excessive quantity of heat might be applied to the reaction vessel by performing the agitating. Agitation power is not particularly limited, and is preferably 0.5 to 20 kW/m$^3$, more preferably 1 to 15 kW/m$^3$. It is preferable to set agitation power more largely as the viscosity of a reaction system becomes higher (or as the content rate of a polymer in a reaction system becomes higher).

The state in the reaction vessel 10 during a polymerization reaction is not particularly limited, and is preferably being made into a state such that a gas phase is not substantially contained therein (this state is hereinafter referred to as 'a flooded state'). The inside of the reaction vessel 10 is preferably made into a flooded state, so that particularly in the case of manufacturing a methacrylate-based polymer, the state can suppress an undesirable phenomenon such that gel attaches and grows to an inner wall surface of the reaction vessel and the mixing of the gel deteriorates the quality of the polymer. In addition, in the case where the state inside of the reaction vessel 10 is made into a flooded state, the whole capacity of the reaction vessel 10 can effectively be utilized for producing the polymer, so that the production efficiency of the polymer can be improved.

One of the simplest and easiest examples of a method for achieving a flooded state in the reaction vessel 10 includes a method of discharge a polymerization syrup produced by a polymerization reaction out of the reaction vessel 10 through an exhaust port 13 placed on the uppermost portion of the reaction vessel 10. In order not to cause vaporization of a raw material monomer in the reaction vessel 10, it is preferred that a pressure in the reaction vessel 10 is adjusted so as to become a pressure more than a vapor pressure of the raw material monomer at a temperature in the reaction vessel. The pressure may be approximately 10 to 20 kg/cm$^2$.

Also, the state in the reaction vessel 10 is preferably made into an adiabatic state in which there is no substantial comings and goings of heat from the outside of the reaction vessel. In order to make the inside of the reaction vessel 10 into such an adiabatic state, it is preferred that a temperature of the inside of the reaction vessel 10 is set approximately equal to a temperature of an outer wall surface thereof. Examples of a means for obtaining such an adiabatic state include a temperature regulation means such as a jacket 15 which can surround an outer wall surface of the reaction vessel 10 to regulate a temperature thereof, as described later.

The adiabatic state inside the reaction vessel 10, particularly in the case of manufacturing a methacrylate-based polymer, may suppress the phenomenon such that gel attaches and grows to an inner wall surface of the vessel and the mixing of this gel deteriorates the quality of the polymer. In addition, the adiabatic state also may stabilize the polymerization reaction and brings self-regulation for restraining a reaction running out of control. It is not preferred that a temperature of an outer wall surface of the reaction vessel is set too high as compared with a temperature in the reaction vessel because of applying excessive heat to the reaction vessel. It is preferred that difference in temperature between the inside of the reaction vessel and the outer wall surface of the reaction vessel is smaller. The difference is preferably regulated in the range of approximately ±5° C.

Heat due to polymerization, agitation and the like in the reaction vessel 10 may be taken away when the content in the reaction vessel 10, i.e., a polymerization syrup, is discharged out of the reaction vessel 10. The heat quantity taken away by polymerization syrup depends on flow rate and specific heat of polymerization syrup and temperature of the polymerization reaction.

The temperature in the reaction vessel 10 during a polymerization reaction may fluctuate in accordance with the conditions in the period to steady state, and is not particularly limited. The temperature in the reaction vessel 10 during a polymerization reaction is preferably set at approximately 120° C. to 180° C., preferably approximately 130° C. to 170° C. When this temperature is extremely high, for example, in the case of producing a methacrylate-based polymer, syndiotacticity of the polymer to be obtained tends to be lowered and the yield of the oligomer thereof tends to be increased, which may result in lowering heat resistance of the resulting polymer product.

The average residence period of time of the raw material monomer in the reaction vessel 10 is set depending on the types of a polymer to be produced, and is not particularly limited. The average residence period of time may be about 15 minutes to about 6 hours, is preferably about 15 minutes to about 3 hours and is more preferably about 20 minutes to about 1.5 hours. When the average residence period of time is more prolonged than required, the yield of oligomers such as a dimer and a trimer is increased to bring a possibility of lowering heat resistance of the resulting polymer product. The average residence period of time can properly be adjusted by modifying the supply flow rate of the raw material monomer per hour.

Examples of the monomer supply means include a monomer supply pump 20 for introducing a raw material monomer through a supply port 12 to the reaction vessel 10.

The monomer supply pump 20 is not particularly limited, and is preferably a pump capable of setting the supply flow rate of the raw material monomer to the reaction vessel 10 at a constant quantity. Examples of the monomer supply pump include a multiple reciprocating pump. Preferably, the monomer supply pump is a nonpulsative metering pump such as a double nonpulsative metering pump and a triple nonpulsative metering pump.

The supply flow rate of a raw material monomer by the monomer supply pump 20 can be controlled by a supply flow rate control means (a control unit 30; described below), and can properly be adjusted depending on a result of detecting a temperature inside the reaction vessel by a temperature detection means (a temperature sensor 31) in the reaction vessel and a preset temperature of a temperature regulation means (a jacket 15) for regulating a temperature of an outer wall surface of the reaction vessel, as described later.

As shown in FIG. 1, a monomer supply tank 21 for storing a raw material monomer is connected to the supply port 12 of the reaction vessel 10 through a monomer supply route (piping) 23. When the monomer supply tank 21 is regarded as the upstream side and the above-mentioned supply port 12 is regarded as the downstream side, then the monomer supply pump 20 is located on the downstream side from the monomer supply tank 21 and is placed on the above-mentioned monomer supply route 23, while a heater/cooler 22 (for heating or cooling the raw material monomer supplied to the reaction vessel 10 up/down to an appropriate temperature) is preferably placed on the downstream side therefrom.

The temperature of the raw material monomer supplied to the reaction vessel 10 is not particularly limited, and is preferably adjusted properly by the heater/cooler 22 since upsetting heat balance in the reaction vessel may become a factor of fluctuating polymerization temperature.

In the apparatus shown in FIG. 1, an initiator supply means is an initiator supply pump 25 for introducing a polymerization initiator from the supply port 12 to the reaction vessel 10.

The initiator supply pump 25 is not particularly limited, and is preferably a pump capable of setting the supply flow rate of a polymerization initiator to the reaction vessel 10 at a constant quantity. Similarly to the above-mentioned monomer supply pump 20, examples thereof include a multiple reciprocating pump and, and is preferably a nonpulsative metering pumps such as a double nonpulsative metering pump and a triple nonpulsative metering pump.

The supply flow rate of the polymerization initiator by the initiator supply pump 25 can be controlled by a supply flow rate control means (a control unit 30; described below), and can be adjusted properly depending on a result of detecting a temperature inside the reaction vessel by a temperature detection means (a temperature sensor 31) in the reaction vessel and a preset temperature of a temperature regulation means (a jacket 15) for regulating a temperature of an outer wall surface of the reaction vessel, as described later.

As shown in FIG. 1, an initiator supply tank 26 for storing a polymerization initiator (or a polymerization initiator containing a raw material monomer, which is hereinafter referred to as 'a polymerization initiator and the like') is connected to the supply port 12 of the reaction vessel 10 through an initiator supply route (piping) 28. When the initiator supply tank 26 is regarded as the upstream side and the above-mentioned supply port 12 is regarded as the downstream side, the initiator supply pump 25 is located on the downstream side from the initiator supply tank 26 and is preferably placed on the above-mentioned initiator supply route 28, while a heater/cooler 27) for heating or cooling a polymerization initiator and the like supplied to the reaction vessel 10 up/down to an appropriate temperature) is place on the downstream side therefrom.

The initiator, which is stored in the initiator supply tank 26 and is supplied to the reaction vessel 10 by the initiator supply means, may or may not be a polymerization initiator singly, but may be a polymerization initiator containing a raw material monomer (or further containing another component such as a chain transfer agent). For example, in the case of supplying a polymerization initiator singly to the reaction vessel 10 by the initiator supply means, there is a possibility of locally progressing a polymerization reaction in the reaction vessel 10; however, the occurrence of such a phenomenon can be avoided by supplying a previous preparation of a polymerization initiator and a raw material monomer to the reaction vessel 10 by the initiator supply means.

The temperature of a polymerization initiator and the like supplied to the reaction vessel 10 is not particularly limited, and is preferably adjusted properly by the heater/cooler 27, since upsetting heat balance in the reaction vessel may become a factor of fluctuating polymerization temperature.

In the apparatus shown in FIG. 1, a temperature detection means for detecting a temperature in the reaction vessel is a temperature sensor 31. The temperature sensor 31 may be placed in the inside of the reaction vessel 10 and be capable of directly detecting a temperature of a reaction system accommodated in the reaction vessel 10; however, the placement and detection method by a temperature sensor are not limited thereto.

The temperature in the reaction vessel 10 detected by the above-mentioned temperature detection means (the temperature sensor 31) is transmitted to a supply flow rate control means (a control unit 30; described below) to become data for determining whether a supply flow rate by the monomer supply means and the initiator supply means needs to be controlled or not.

Examples of a temperature regulation means for regulating the temperature of the outer wall surface of the reaction vessel include a jacket for covering the outer wall surface of the reaction vessel and a heater placed in the reaction vessel. Among them, the temperature regulation means is preferably a jacket for covering the outer wall surface of the reaction vessel, and is more preferably a jacket 15 for covering approximately the whole outer wall surface of the reaction vessel 10, from the viewpoint of making the inside of the reaction vessel into an adiabatic state.

The jacket 15 shown in FIG. 1 covers approximately the whole reaction vessel 10 and introduces heat medium such as vapor, hot water and organic heating medium from a heat medium supply route 16 to thereby heat or keep warm the reaction vessel 10 properly. The temperature of the jacket 15 can properly be adjusted by temperature or pressure of heat medium to be supplied. Heat medium introduced to the jacket 15 is removed from a heat medium exhaust route 17. The temperature and pressure of the jacket 15 are detected by a sensor such as a temperature sensor 32 provided for the heat medium exhaust route 17. The place where a sensor such as the temperature sensor 32 is equipped is not particularly limited. For example, the temperature sensor 32 is equipped on the heat medium supply route 16, in the jacket 15, or the like.

A polymerization reaction in the reaction vessel 10 is preferably performed with polymerization temperature approximately constant in order to have a polymer with a good quality constantly. Therefore, the temperature regulation means (the jacket 15) is preferably controlled at a constant temperature previously set so as to be capable of maintaining the temperature in the reaction vessel 10 approximately constant.

Such a preset temperature of the temperature regulation means (the jacket 15) is transmitted to a supply flow rate control means (a control unit 30; described below) to become data for determining whether a supply flow rate by the monomer supply means and the initiator supply means needs to be controlled or not. The preset temperature of the temperature regulation means (the jacket 15) can be provided by controlling temperature or pressure of the above-mentioned heat medium.

Examples of a supply flow rate control means include a control unit 30 equipped with CPU, ROM, RAM and the like.

ROM for the control unit 30 is an apparatus for storing a program for controlling the monomer supply pump 20 and the initiator supply pump 25, and RAM for the control unit 30 is an apparatus for temporarily storing temperature data in the reaction vessel 10 detected by the temperature sensor 31 and data of the preset temperature of the jacket 15 in order to execute the program stored in the ROM.

CPU for the control unit 30 executes the program stored in the ROM on the basis of temperature data in the reaction vessel 10 and data of the preset temperature of the jacket 15 stored in the RAM, to control a supply flow rate of the raw material monomer and/or the polymerization initiator to the reaction vessel 10 by the monomer supply means (the monomer supply pump 20) and/or the initiator supply means (the initiator supply pump 25).

One of specific examples of control by the supply flow rate control means (the control unit 30) is described below:

For example, when a temperature in the reaction vessel 10 detected by the temperature sensor 31 exceeds a preset temperature of the jacket 15 as a temperature regulation means, the program in the ROM is executed by the CPU to control the initiator supply pump 25 so as to decrease a supply flow rate of the polymerization initiator to the reaction vessel 10. The performance of such control allows heat of polymerization generated in the reaction vessel 10 to be decreased and consequently a temperature in the reaction vessel 10 to be lowered. On the other hand, when a temperature in the reaction vessel 10 is lower than the preset temperature of the jacket 15, the program in the ROM is executed by the CPU to control the initiator supply pump 25 so as to increase the supply flow rate of the polymerization initiator to the reaction vessel 10. The performance of such control allows heat of polymerization generated in the reaction vessel 10 to be increased and consequently a temperature in the reaction vessel 10 to be raised.

In the present invention, when a polymerization reaction in the reaction vessel 10 is carried out in a flooded state so that a total supply flow rate to the reaction vessel 10 is notably decreased as a result of controlling the initiator supply pump 25, it is preferred that not merely a supply flow rate of the polymerization initiator is decreased by controlling the initiator supply pump 25, but also a supply flow rate of the raw material monomer is simultaneously increased by controlling the monomer supply pump 20.

An alternative example of control by the supply flow rate control means (the control unit 30) is described below:

For example, when a temperature in the reaction vessel 10 detected by the temperature sensor 31 exceeds a preset temperature of the jacket 15 as a temperature regulation means, a supply flow rate of the raw material monomer is increased by controlling the monomer supply pump 20 to thereby decrease a relative supply flow rate of the polymerization initiator to the reaction vessel 10. Such control also allows a temperature in the reaction vessel 10 to be lowered.

The ratio of a supply flow rate of the raw material monomer to a supply flow rate of the polymerization initiator is preferred to be properly set depending on the types of a polymer to be produced and the types of a polymerization initiator to be used.

The degree of increasing or decreasing a supply flow rate of the raw material monomer and a supply flow rate of the polymerization initiator can be also set properly depending on kinds of a product polymer to be produced and kinds of the polymerization initiator used. When the polymerization initiator is not supplied singly but supplied with containing the raw material monomer to the reaction vessel 10 as described above, the supply flow rate of the polymerization initiator (containing the raw material monomer) is preferably controlled in consideration of the concentration of the polymerization initiator in the raw material monomer.

A polymer produced by a polymerization reaction is taken out of the exhaust port 13 of the reaction vessel 10 as polymerization syrup, and transferred and recovered through a polymerization syrup lead-out route 35. The unreacted raw material monomer is contained in this polymerization syrup, which is thereby heated as required to vaporize and separate volatile content consisting essentially of the unreacted raw material monomer. A method described in Japanese Examined Patent Publication No. 4-48802 is appropriate as a method of transferring the polymerization syrup. A method employing a devolatizing extruder has been known as a method of vaporizing and separating the above-mentioned volatile content (see, for example, Japanese Examined Patent Publication Nos. 51-29914 and 52-17555, and Japanese Unexamined Patent Publication Nos. 1-53682, 62-89710 and 3-49925.

When the reaction vessel is a complete mixing-type reaction vessel, a conversion (degree) of polymerization (at which the monomer is converted into the polymer in the reaction vessel) is approximately equivalent to the concentration of the polymer in the polymerization syrup. In the present invention, the rate of polymerization is not particularly limited, and may be set at 40% by weight to 70% by weight. The higher rate of polymerization brings higher productivity of the polymer, while too much higher rate of polymerization may make the viscosity of a reaction system become so higher as to require greater agitation power. On the other hand, too much lower rate of polymerization may bring lower productivity of the polymer and greater load for recovering the unreacted raw material monomer.

In FIG. 1, the raw material monomer separated and recovered from the polymerization syrup is stored in a monomer recovery tank 35 and then supplied to the monomer supply tank 21 again as required, which monomer can thereby be subject to a polymerization reaction. With regard to the recovered raw material monomer, in order that a polymerization reaction may not progress while stored in the monomer recovery tank 35 and the monomer supply tank 21, it is preferred to make a polymerization inhibitor exist at a concentration of 2 ppm to 8 ppm, set the oxygen concentration of a gas phase portion at 2% by volume to 8% by volume and additionally store in a cooled state, for example, under a low temperature of approximately 0° C. to 5° C.

An apparatus and method for continuous polymerization in the present invention can be used and applied as described above to the production of a methacrylate-based polymer such as polymethyl methacrylate (PMMA).

In producing a methacrylate-based polymer, examples of the raw material monomer to be supplied to the reaction vessel 10 include a methacrylate-based monomer.

Examples of the methacrylate-based monomer include alkyl methacrylate (in which the alkyl group has a carbon number of 1 to 4), a mixture of 80% by weight or more of alkyl methacrylate (in which the alkyl group has a carbon number of 1 to 4) and 20% by weight or less of another vinyl monomer copolymerizable therewith.

Examples of the alkyl group in the alkyl methacrylate include methyl, ethyl, n-propyl, isopropyl, n-butyl and tert-butyl. Among them, methyl is preferred, and therefore, a methyl methacrylate is preferred as the methacrylate-based monomer.

Examples of the above-mentioned copolymerizable vinyl monomer include methacrylates such as ethyl methacrylate, propyl methacrylate, butyl methacrylate and benzyl methacrylate; acrylates such as methyl acrylate, ethyl acrylate, propyl acrylate, butyl acrylate and 2-ethylhexyl acrylate; unsaturated carboxylic acids or acid anhydrides thereof such as acrylic acid, methacrylic acid, maleic acid, itaconic acid, maleic anhydride and itaconic anhydride; hydroxyl group-containing monomers such as 2-hydroxyethyl acrylate, 2-hydroxypropyl acrylate, monoglycerol acrylate, 2-hydroxyethyl methacrylate, hydroxypropyl methacrylate and monoglycerol methacrylate; nitrogen-containing monomers such as acrylamide, methacrylamide, acrylonitrile, methacrylonitrile, diacetone acrylamide and dimethylaminoethyl methacrylate; epoxy group-containing monomers such as allyl glycidyl ether, glycidyl acrylate and glycidyl methacrylate; and styrene-based monomers such as styrene and α-methyl styrene.

When the present invention is applied to the production of a methacrylate-based polymer, examples of the polymerization initiator to be supplied to the reaction vessel 10 include a radical initiator.

Examples of the above-mentioned radical initiator include azo compounds such as azobisisobutyronitrile, azobisdimethylvaleronitrile, azobiscyclohexanenitrile, 1,1'-azobis(1-acetoxy-1-phenylethane), dimethyl2,2'-azobisisobutyrate and 4,4'-azobis-4-cyanovaleric acid; and organic peroxides such as benzoyl peroxide, lauroyl peroxide, acetyl peroxide, caprylyl peroxide, 2,4-dichlorbenzoyl peroxide, isobutyl peroxide, acetylcyclohexylsulfonylperoxide, tert-butylperoxypivalate, tert-butyl peroxy-2-ethyl hexanoate, 1,1-di-tert-butyl peroxycyclohexane, 1,1-di-tert-butyl peroxy-3,3,5-trimethylcyclohexane, 1,1-di-tert-hexyl peroxy-3,3,5-trimethylcyclohexane, isopropyl peroxydicarbonate, isobutyl peroxydicarbonate, sec-butyl peroxydicarbonate, n-butyl peroxydicarbonate, 2-ethylhexyl peroxydicarbonate, bis(4-tert-butylcyclohexyl)peroxydicarbonate, tert-amyl peroxy-2-ethyl hexanoate, 1,1,3,3-tetramethylbutyl peroxy-ethyl hexanoate, 1,1,2-trimethylpropyl peroxy-2-ethyl hexanoate, tert-butylperoxyisopropylmonocarbonate, tert-amyl peroxyisopropylmonocarbonate, tert-butylperoxy-2-ethylhexyl carbonate, tert-butyl peroxyallyl carbonate, tert-butyl peroxyisopropyl carbonate, 1,1,3,3-tetramethylbutyl peroxyisopropyl monocarbonate, 1,1,2-trimethylpropyl peroxyisopropyl monocarbonate, 1,1,3,3-tetramethylbutyl peroxyisononanoate, 1,1,2-trimethylpropyl peroxy-isononanoate and tert-butyl peroxybenzoate. These radical initiators may be used singly in one kind or may be used in a mixture of two or more kinds of them.

The amount of the radical initiator to be used is not particularly limited, and may be 0.001% by weight to 1% by weight with respect to the raw material monomer.

The polymerization initiator to be supplied to the reaction vessel 10 not particularly limited in the present invention and is appropriately selected depending on kinds of a product polymer and a raw material monomer to be used. If a radical polymerization initiator is used as the polymerization initiator, a radical polymerization initiator having a half-value period within 1 minute at polymerization temperature is preferably utilized. The radical polymerization initiator having a half-value period of more than 1 minute at polymerization temperature may slow down the rate of reaction to thereby bring a possibility of not being suitable for a continuous polymerization reaction.

When the present invention is applied to the production of a methacrylate-based polymer, a chain transfer agent can be blended into the reaction vessel 10 in order to adjust the molecular weight of a polymer to be produced.

The chain transfer agent may be either of monofunctional and multifunctional chain transfer agents, and specific examples thereof include alkyl mercaptans such as propyl mercaptan, butyl mercaptan, hexyl mercaptan, octyl mercaptan, 2-ethylhexyl mercaptan and dodecyl mercaptan; aromatic mercaptans such as phenyl mercaptan and thiocresol; mercaptans with a carbon number of 18 or less such as ethylene thioglycol; polyhydric alcohols such as ethylene glycol, neopentyl glycol, trimethylolpropane, pentaerythritol, dipentaerythritol, tripentaerythritol and sorbitol; esterified substance of a hydroxyl group with thioglycolic acid or 3-mercaptopropionic acid, 1,4-dihydronaphthalene, 1,4,5,8-tetrahydronaphthalene, β-terpinene, terpinolene, 1,4-cyclohexadiene, 1,4cyclohexadiene, and hydrogen sulfide. These may be used in a simple substance or in a combination of two kinds or more.

When the chain transfer agent is used, the amount of the chain transfer agent is not particularly limited and varies depending on kinds of the chain transfer agent to be used. For example, in the case of using mercaptans as the chain transfer agent, the amount is preferably 0.01 part by weight to 3 parts by weight, more preferably 0.05 part by weight to 1 part by weight with respect to 100 parts by weight of the raw material monomer.

Also, when the present invention is applied to the production of a methacrylate-based polymer, the ratio A:B of a supply flow rate A (kg/h) of the methacrylate-based monomer as the raw material monomer to a supply flow rate B (kg/h) of a mixture of the methacrylate-based monomer and the polymerization initiator (with a concentration of the polymerization initiator of 0.002% by weight to 10% by weight) is preferably adjusted so as to be in the range of 80:20 to 98:2.

When the present invention is applied to the production of PMMA, an unreacted methylmethacrylate (MMA) monomer separated and recovered from the polymerization syrup is preferably mixed with a polymerization inhibitor so that a polymerization reaction is not started in the recovery tank 35 and the monomer supply tank 21. Specifically, with regard to the recovered MMA, it is preferred to make a polymerization inhibitor (for example, a trade name of 'Topanol A') exist at a concentration of 2 ppm to 8 ppm, set the oxygen concentration of a gas phase portion of the recovered MMA monomer at 2% by volume to 8% by volume, and additionally store the MMA monomer in the recovery tank 35 and the monomer supply tank 21 with a portion thereof cooled. On this occasion, the temperature of the monomer in the above-mentioned tanks is preferably maintained in the range of 0° C. to 5° C. Such storage allows the MMA monomer to be preserved over a long period of time while preventing a polymerization reaction thereof.

When a polymerizing apparatus of the present invention is an apparatus for a continuous solution polymerizing reaction, the apparatus may further comprises a tank, a supply route and a supply means (such as a pump) for supplying a solvent to be used for a polymerization reaction.

Here, the tank, the supply route and the a supply means (such as a pump) for supplying a solvent are not particularly limited, and may be the same as the conventionally used tank and the like. The solvent may be supplied to a reaction vessel after being mixed with a raw material monomer and/or a polymerization initiator, or may be supplied directly to a reaction vessel.

The continuous solution polymerizing reaction can be conducted in the same manner as the above-mentioned continuous bulk polymerizing method except for using a solvent. A solvent to be used for a polymerization reaction is not particularly limited and is properly selected depending on a raw material monomer for the continuous solution polymerization reaction. Examples of the solvent includes toluene, xylene, ethyl benzene, methyl isobutyl ketone, methyl alcohol, ethyl alcohol, octane, decane, cyclohexane, decalin, butyl acetate and pentyl acetate.

In the continuous solution polymerizing reaction, the ratio C:D of a supply flow rate C (kg/h) of the raw material monomer to a supply flow rate D (kg/h) of the solvent is, but not limited to, preferably 70:30 to 95:5, and is more preferably 80:20 to 90:10.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2004-291151 filed on Oct. 4, 2004, including specification, claims, drawings and summary, are incorporated herein by reference in their entirety.

EXAMPLE

Polymethyl methacrylate was manufactured by using an apparatus for continuous bulk polymerization shown in FIG. 1.

A complete mixing-type reaction vessel (internal capacity: 4.7 m$^3$) equipped with a MIG blade (70 rotations per minute) as an agitating blade 11 and a jacket 15 for covering approximately the whole reaction vessel was used as a reaction vessel 10.

A mixture containing 94.6% by weight of methyl methacrylate (MMA), 5.3% by weight of methacrylate (MA) and 0.08% by weight of a chain transfer agent (n-octyl mercaptan) was used as a raw material monomer supplied by a monomer supply means.

A quintuple reciprocating pump was used for a monomer supply pump 20, of which supply flow rate was fixed at 9600 kg/h.

A mixture containing 94.0% by weight of methyl methacrylate (MMA), 5.3% by weight of methacrylate (MA), 0.10% by weight of a chain transfer agent (n-octyl mercaptan) and 0.46% by weight of a polymerization initiator (1,1-di-tert-butyl peroxy-3,3,5-trimethylcyclohexane) was used as a polymerization initiator to be supplied by a polymerization initiator supply means.

A triple reciprocating pump was used for an initiator supply pump 25. A supply flow rate thereof was set at 500 kg/h in starting polymerization, and thereafter was properly fluctuated by changing the output value of the pump depending on the temperature change in the reaction vessel.

The manufacture of polymethyl methacrylate was continuously performed for more than 7 days. The relation of the temperature in the reaction vessel and the supply flow rate of the polymerization initiator is shown in FIG. 2.

Figure 2:
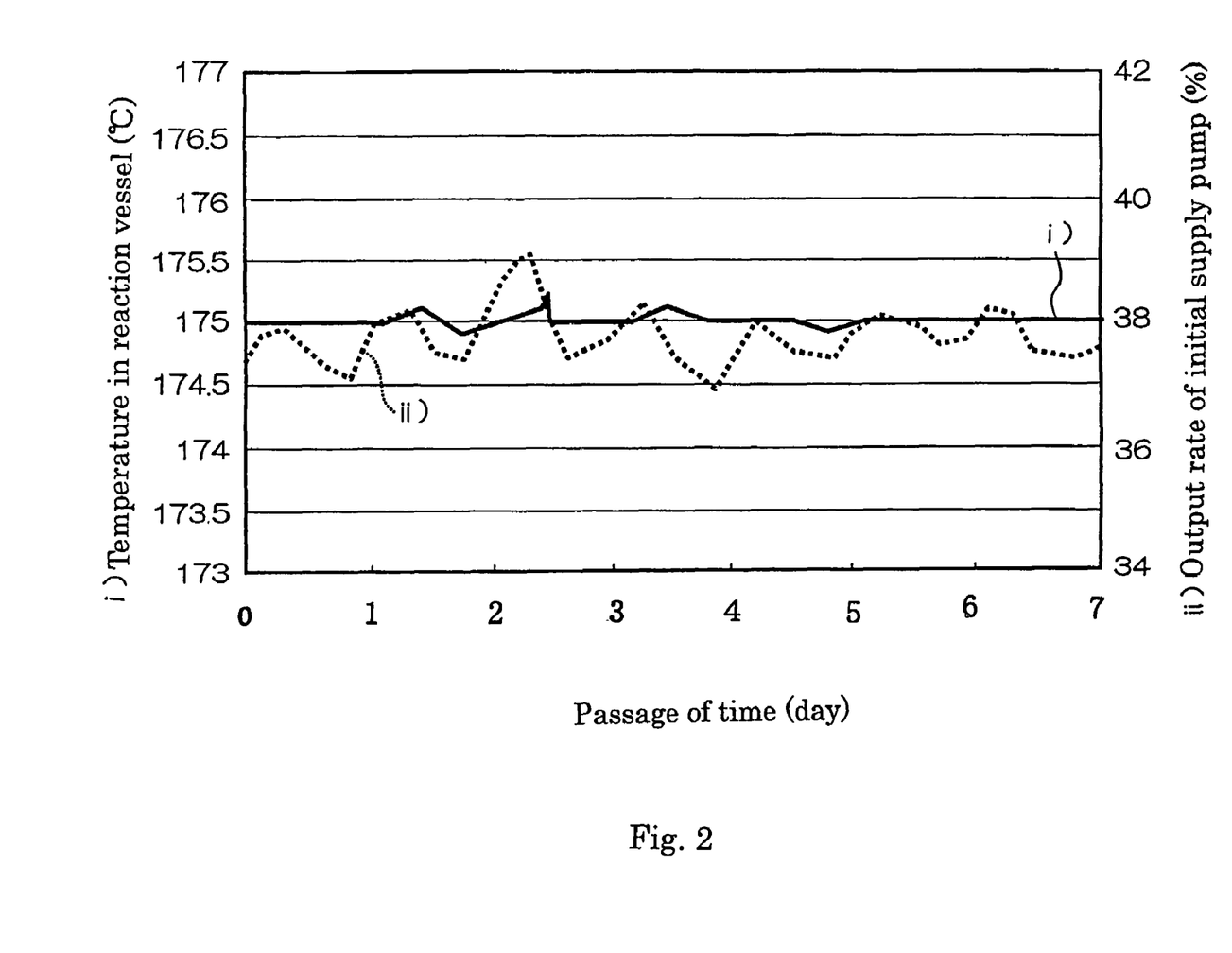
FIG. 2 is a graph showing a relation of the temperature in a reaction vessel and the supply flow rate of a polymerization initiator.

As shown in FIG. 2, the supply flow rate of the polymerization initiator was controlled in accordance with the present invention, and the temperature in the reaction vessel was maintained constant over a long period of more than 7 days.

What is claimed is:

1. An apparatus for continuous polymerization, which comprises:
   a reaction vessel;
   a means for supplying a raw material monomer to the reaction vessel;
   a means for supplying a polymerization initiator to the reaction vessel;
   a means for detecting a temperature in the reaction vessel;
   an exhaust port for discharging a polymerization syrup, which port is placed on the uppermost portion of the reaction vessel, to achieve a state such that a gas phase is not substantially contained in the reaction vessel;
   a means for regulating a temperature of an outer wall surface of the reaction vessel so as to have a preset temperature; and
   a means for controlling a supply flow rate of the raw material monomer and/or the polymerization initiator to the reaction vessel by the monomer supply means and/or the initiator supply means so that the temperature in the reaction vessel becomes substantially the same temperature as the preset temperature of the temperature regulation means.

2. The apparatus according to claim 1, wherein said initiator supply means is controlled by said supply flow rate control means so that, when the temperature in the reaction vessel is higher than and lower than the preset temperature of said temperature regulation means, the supply flow rate of the polymerization initiator to said reaction vessel is decreased and increased, respectively.

3. A method for continuous polymerization using an apparatus for continuous polymerization which comprises:
   a reaction vessel;
   a means for supplying a raw material monomer to the reaction vessel;
   a means for supplying a polymerization initiator to the reaction vessel;
   a means for detecting a temperature in the reaction vessel;
   a means for regulating a temperature of an outer wall surface of the reaction vessel so as to have a preset temperature; and
   a means for controlling a supply flow rate of the raw material monomer and/or the polymerization initiator to the reaction vessel by the monomer supply means and/or the initiator supply means so that the temperature in the reaction vessel becomes substantially the same temperature as the preset temperature of the temperature regulation means,
   the method comprising the steps of:
   continuously supplying a raw material monomer and a polymerization initiator to the reaction vessel;
   controlling a supply flow rate of the raw material monomer and/or the polymerization initiator to the reaction vessel so that the temperature in the reaction vessel becomes substantially the same temperature as the preset temperature of the temperature regulation means, to conduct a polymerization of the raw material monomer,
   discharging a polymerization syrup produced by the polymerization out of the reaction vessel through an exhaust port placed on the uppermost portion of the reaction vessel.

4. The method according to claim 3, wherein said initiator supply means is controlled by said supply flow rate control means so that, when the temperature in the reaction vessel is higher than and lower than the preset temperature of said temperature regulation means, the supply flow rate of the polymerization initiator to said reaction vessel is decreased and increased, respectively.

5. A method for continuous polymerization using an apparatus for continuous polymerization in a flooded state which comprises:
   a reaction vessel;
   a means for supplying a raw material monomer to the reaction vessel;
   a means for supplying a polymerization initiator to the reaction vessel;
   a means for detecting a temperature in the reaction vessel;
   a means for regulating a temperature of an outer wall surface of the reaction vessel so as to have a preset temperature; and,
   a means for controlling a supply flow rate of the raw material monomer and/or the polymerization initiator to the reaction vessel by the monomer supply means and/or the initiator supply means so that the temperature in the reaction vessel becomes substantially the same temperature as the preset temperature of the temperature regulation means,
   the method comprising the steps of:
   continuously supplying a raw material monomer and a polymerization initiator to the reaction vessel; and
   controlling a supply flow rate of the raw material monomer and/or the polymerization initiator to the reaction vessel so that the temperature in the reaction vessel becomes substantially the same temperature as the preset temperature of the temperature regulation means, to conduct a polymerization of the raw material monomer,
   wherein said raw material monomer is a methacrylate-based monomer;
   the preset temperature of the temperature regulation means is in the range of 120 to 180° C.; and
   a ratio A:B of a supply flow rate A (kg/h) of the methacrylate-based monomer to a supply flow rate B (kg/h) of a mixture of the methacrylate-based monomer and the polymerization initiator is in the range between 80:20 and 98:2.

6. A method for continuous polymerization using an apparatus for continuous polymerization in a flooded state which comprises:
   a reaction vessel;
   a means for supplying a raw material monomer to the reaction vessel;
   a means for supplying a polymerization initiator to the reaction vessel;
   a means for detecting a temperature in the reaction vessel;
   a means for regulating a temperature of an outer wall surface of the reaction vessel so as to have a preset temperature; and,
   a means for controlling a supply flow rate of the raw material monomer and/or the polymerization initiator to the reaction vessel by the monomer supply means and/or the initiator supply means so that the temperature in the reaction vessel becomes substantially the same temperature as the preset temperature of the temperature regulation means,
   the method comprising the steps of:
   continuously supplying a raw material monomer and a polymerization initiator to the reaction vessel;

controlling a supply flow rate of the raw material monomer and/or the polymerization initiator to the reaction vessel so that the temperature in the reaction vessel becomes substantially the same temperature as the preset temperature of the temperature regulation means, to conduct a polymerization of the raw material monomer and, discharging a polymerization syrup produced by the polymerization out of the reaction vessel through an exhaust port placed on the uppermost portion of the reaction vessel.

* * * * *